United States Patent [19]
Lungershausen et al.

[11] Patent Number: 5,809,355
[45] Date of Patent: Sep. 15, 1998

[54] APPARATUS AND METHOD FOR RECORDING ON SEPARATE FILM FRAMES RIGHT AND LEFT PICTURE-TAKING POSITIONS OF SINGLE-LENS CAMERA FOR STEREOSCOPIC PHOTOGRAPHY

[75] Inventors: Arnold W. Lungershausen, West Henrietta; Anthony W. Schrock, Rochester, both of N.Y.

[73] Assignee: Eastman Kodak Company, Rochester, N.Y.

[21] Appl. No.: 781,676

[22] Filed: Jan. 10, 1997

[51] Int. Cl.⁶ ............................ G03B 29/00; G03B 17/24
[52] U.S. Cl. .............................................. 396/319; 396/329
[58] Field of Search ...................... 396/315, 319, 396/320, 329, 335

[56] References Cited

U.S. PATENT DOCUMENTS

| | | | |
|---|---|---|---|
| 713,177 | 11/1902 | Thomsen | 396/329 |
| 962,844 | 6/1910 | Kaufmann | 396/329 |
| 1,371,438 | 3/1921 | Prucha | 396/329 |
| 2,279,443 | 4/1942 | Chanosky | 396/329 |
| 2,671,392 | 3/1954 | Robins | 396/329 |
| 4,478,639 | 10/1984 | Smith et al. | 430/9 |
| 4,768,049 | 8/1988 | Barrett et al. | 396/329 |
| 4,965,627 | 10/1990 | Robison | 355/40 |

*Primary Examiner*—Howard B. Blankenship
*Attorney, Agent, or Firm*—Roger A. Fields

[57] ABSTRACT

Respective image representations of a scene in front of a camera are recorded on a recording medium, such as a filmstrip, when the camera is at two separated viewpoints with respect to the scene, in order to obtain a matched pair of right-eye and left-eye pictures that can be simultaneously viewed to present a stereoscopic image of the scene. Respective indications are recorded on the recording medium, distinguishable from the image representations, that the image representations were recorded with the camera at the two separated viewpoints with respect to the scene. Thus, the matched pair of pictures can be kept in the right order for stereoscopic right-eye and left-eye viewing.

9 Claims, 3 Drawing Sheets

5,809,355

APPARATUS AND METHOD FOR RECORDING ON SEPARATE FILM FRAMES RIGHT AND LEFT PICTURE-TAKING POSITIONS OF SINGLE-LENS CAMERA FOR STEREOSCOPIC PHOTOGRAPHY

FIELD OF THE INVENTION

The invention relates generally to the field of stereoscopic photography, and in particular to an apparatus and a method for recording on separate film frames right and left picture-taking positions of a single-lens camera for stereoscopic photography.

BACKGROUND OF THE INVENTION

A stereoscopic camera typically has a pair of matched taking lenses designed to take two simultaneous pictures of the same scene in front of the camera. The pictures are taken from two different viewpoints of the camera, usually slightly separated by the same distance as a pair of normal human eyes, but the distance may be increased or decreased when photographing distant or far objects. When the subsequent positive prints are looked at together through a suitable stereoscopic viewer they combine to give a three-dimensional reproduction of the original scene. The left eye must see the print made from the negative taken with the left hand lens of the stereoscopic camera, and the right eye must see the print made from the negative taken with the right hand lens of the stereoscopic camera.

Alternatively, as suggested in prior art U.S. Pat. No. 4,768,049, issued Aug. 30, 1988, No. 2,671,392, issued Feb. 28, 1951, No. 2,279,443, issued May 11, 1940, No. 1,371,439, issued Mar. 15, 1921, and No. 713,177, issued Nov. 11, 1902, an ordinary camera with only a single taking lens can be used to sequentially expose respective images of the same scene on a pair of substantially adjacent film frames when the camera is in right and left picture-taking positions. The distance between the right and left picture-taking positions is chosen in order to obtain a matched pair of pictures that when looked at together through a suitable stereoscopic viewer present a stereoscopic image of the original scene. A tripod support for the camera typically has two pre-set locations for locating the camera in the right and left picture-taking positions.

SUMMARY OF THE INVENTION

According to one aspect of the invention a camera comprising means for recording respective image representations of a scene on a recording medium when the camera is at two separated viewpoints with respect to the scene in order to obtain a pair of matched pictures that can be simultaneously viewed to present a stereoscopic image of the scene, is characterized by:

means for recording respective indications on the recording medium, distinguishable from the image representations, that the image representations were recorded the said camera at the two separated viewpoints with respect to the scene. Thus, the pair of matched pictures can be kept in the right order for stereoscopic right-eye and left-eye viewing.

According to a second aspect of the invention a stereoscopic picture-taking method comprising the particular step of recording respective image representations of a scene on a recording medium when the camera is at two separated viewpoints with respect to the scene in order to obtain a pair of matched pictures that can be simultaneously viewed to present a stereoscopic image of the scene, is characterized by the further step of:

recording respective indications on the recording medium, distinguishable from the image representations, that the image representations were recorded with the camera at the two separated viewpoints with respect to the scene.

According to a third aspect of the invention stereoscopic apparatus comprising a support which has two pre-set locations for locating a camera selectively in two separated viewpoints with respect to a scene in front of the camera to permit the camera to record respective image representations of the scene on a recording medium when the camera is at the two separated viewpoints in order to obtain matched pictures that can be simultaneously viewed to present a stereoscopic image of the scene, is characterized by:

means for enabling recording means in the camera when the camera is at either one of the two pre-set locations on the support to permit the recording means to record respective indications on the recording medium, distinct from the image representations, that the image representations were recorded with the camera at the two separated viewpoints with respect to the scene.

DETAILED DESCRIPTION OF THE INVENTION

The invention is disclosed as being embodied preferably in a camera and a tripod support for the camera. Because the features of a camera and a tripod support for the camera are generally known, the description which follows is directed in particular only to those elements forming part of or cooperating directly with the disclosed embodiment. It is to be understood, however, that other elements may take various forms known to a person of ordinary skill in the art.

Figure 1:
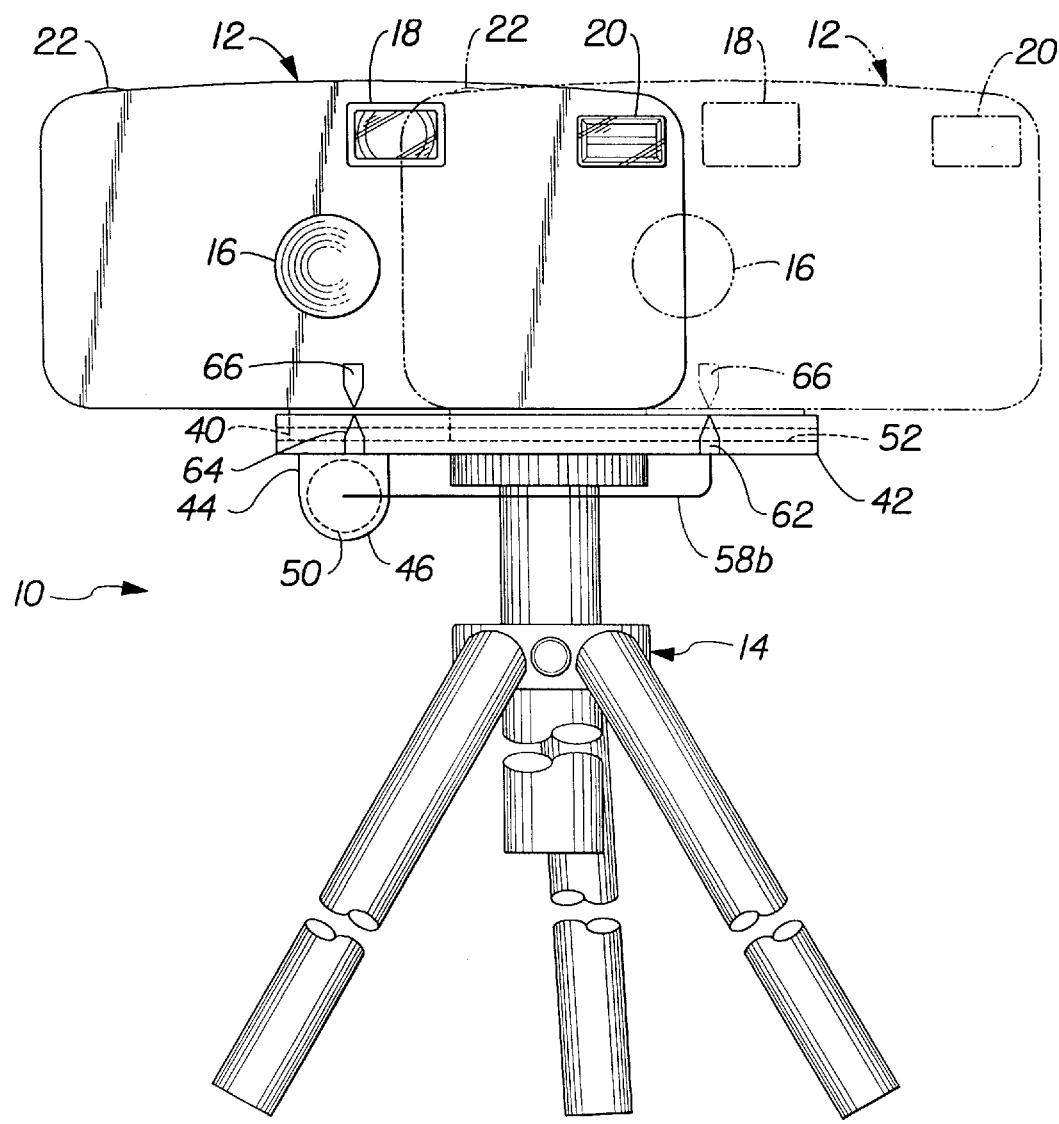
FIG. 1 is a front elevation view of a stereoscopic apparatus in conformance with a preferred embodiment of the invention.
Figure 2:
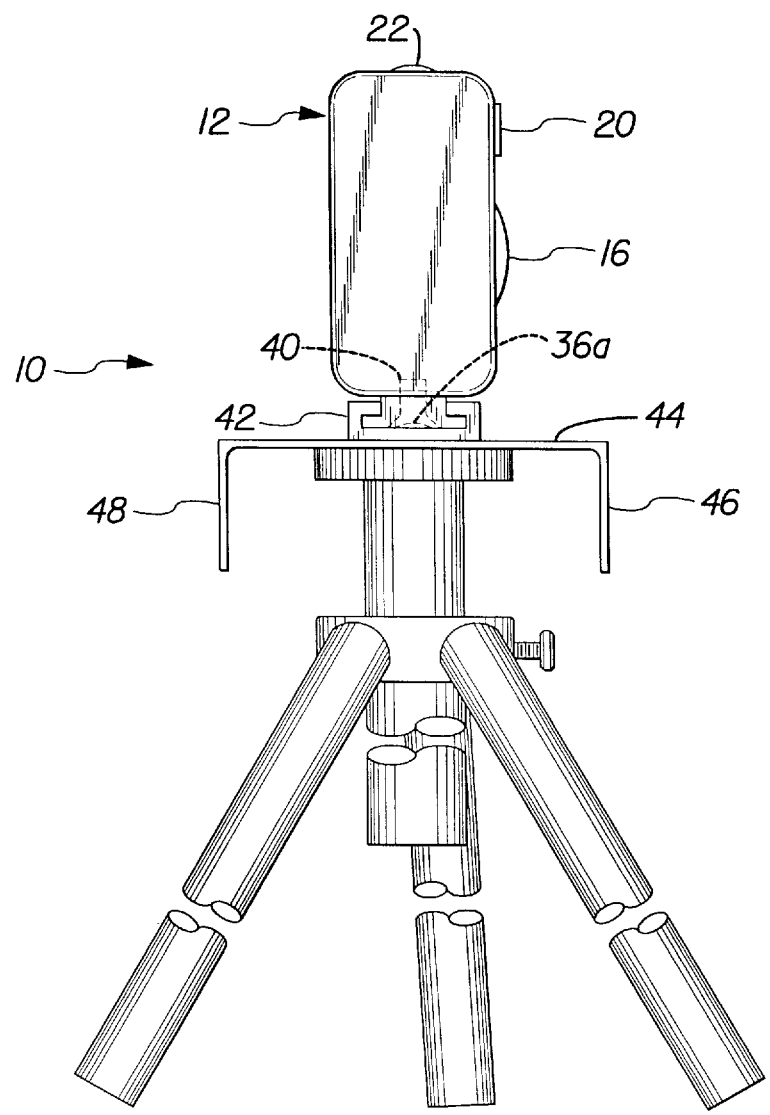
FIG. 2 is a side elevation view of the stereoscopic apparatus.
Figure 3:
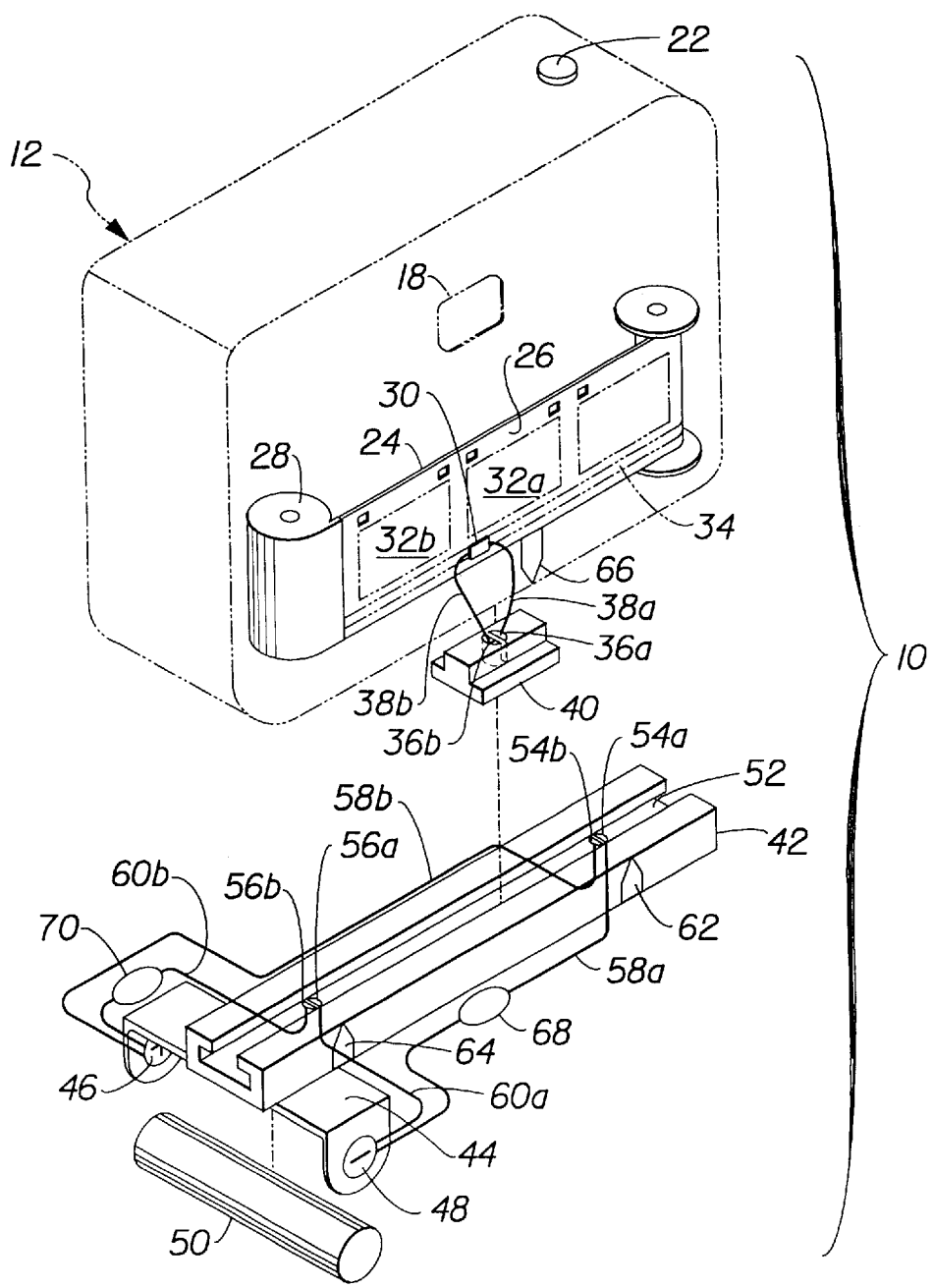
FIG. 3 is an exploded perspective view of the stereoscopic apparatus.

Referring now to the drawings, FIGS. 1–3 show a stereoscopic apparatus 10 which comprises a camera 12 and a tripod support 14.

The camera 12 to a certain extent is a known one. For example, it has a single taking lens 16, a viewfinder 18, an electronic flash unit 20 and a shutter release button 22, and is intended to be used with a recently introduced "Advanced Photo System" filmstrip 24. As shown in FIG. 3, the filmstrip 24 includes a virtually transparent magnetic layer 26, and is originally provided in a leaderless drop-in cassette 28 that thrusts the filmstrip out of the cassette for exposure in the camera 12 and then withdraws the filmstrip back into the cassette. The cassette 28 has a light lock, not shown, that is pivoted open to allow the filmstrip 24 to be thrust from the cassette and is pivoted closed to prevent ambient light from entering the cassette. A fixed magnetic head 30 in the camera 12 is positioned alongside successive frames of the filmstrip 24, such as the substantially adjacent film frames 32a and 32b, to record spaced bits of information in a dedicated magnetic track 34 on the magnetic layer 26, as the filmstrip is longitudinally advanced in the camera. The spaced bits of information are recorded in the magnetic track 34, opposite pairs of the film frames 32a and 32b, though not necessarily opposite every one of the film frames. For a further explanation of recording in magnetic tracks on the magnetic layer 26, see commonly assigned U.S. Pat. No. 4,965,627, No. 5,130,745 and No. 5,229,810.

A rigid electrical contact comprises a pair of slightly spaced contact-halves 36a and 36b which are connected to the magnetic head 30 via respective wire leads 38a and 38b, and are partially embedded in an accessory shoe 40 that projects from the bottom of the camera 12. See FIG. 3. The contact-halves 36a and 36b slightly protrude from the bottom of the shoe 40. The shoe 40 may be one that is permanently attached to the camera 12, or it can be disassembled from the camera to be separately stored.

The tripod support 14 includes a support bar 42, and a bracket 44 which is secured to the support bar and has spaced positive and negative resilient electrical contacts 46 and 48 for holding a replaceable battery 50 between them. See FIG. 3. The support bar 42 has a channel 52 in which is located two separated rigid electrical contacts comprising a pair of slightly spaced contact-halves 54a and 54b and a pair of slightly spaced contact-halves 56a and 56b. The respective contact-halves 54a and 54b and 56a and 56b slightly protrude into the channel 52 and are connected to the positive and negative contacts 46 and 48 via respective pairs of wire leads 58a and 58b and 60a and 60b. The shoe 40 is fitted in the channel 52 for back and forth movement, together with the camera 12, between two pre-set locations indicated by respective visible alignment indicators 62 and 64 on the support bar 42. A visible alignment indicator 66 is provided on the the camera 12 to align with either one of the two alignment indicators 62 and 64. When the indicator 66 is aligned with the indicator 62, the respective contact-halves 36a and 36b are in touch with the contact-halves 54a and 54b to connect the battery 50 to the magnetic head 30. When the indicator 66 is aligned with the indicator 64, the respective contact-halves 36a and 36b are in touch with the contact-halves 56a and 56b to connect the battery 50 to the magnetic head 30. Connection of the battery 50 to the magnetic head 30 allows the magnetic head to record information in the magnetic track 34.

Operation

The single taking lens 16 is used to sequentially expose respective images of the same scene on a substantially adjacent pair of the film frames 32a and 32b when the camera 12 is in a right picture-taking position, shown in solid line in FIG. 1, and in a left picture-taking position, shown in broken line in FIG. 1, in order to obtain a matched pair of right-eye and left-eye positive prints or slides that can be viewed together to present a stereoscopic image of the original scene. The right and left picture-taking positions are established by aligning the single visible alignment indicator 66 on the back of the camera 12 with either one of the two alignment indicators 62 and 64 on the support bar 42.

When the camera 10 is in the right picture-taking position, the respective contact-halves 36a and 36b, slightly protruding from the bottom of the shoe 40, are in touch with the contact-halves 56a and 56b, slightly protruding into the channel 52. In this instance, the battery 50 is connected to the magnetic head 30 in order to permit the magnetic head to magnetically record an indication in the magnetic track 34, opposite the film frame 32a, that the film frame was exposed with the camera in the right picture-taking position. See FIGS. 1 and 3. A known right controller-encoder 68 in the lead 58a is used to provide an input signal to the magnetic head which represents the indication.

When the camera 10 is in the left picture-taking position, the respective contact-halves 36a and 36b, slightly protruding from the bottom of the shoe 40, are in touch with the contact-halves 54a and 54b, slightly protruding into the channel 52. In this instance, the battery 50 is connected to the magnetic head 30 in order to permit the magnetic head to magnetically record an indication in the magnetic track 34, opposite the film frame 32b, that the film frame was exposed with the camera in the left picture-taking position. See FIG. 3. A known left controller-encoder 70 in the lead 60b is used to provide an input signal to the magnetic head which represents the indication.

Accordingly, a matched pair of right-eye and left-eye positive prints or slides made from the respective frames 32a and 32b can be kept in the right order for stereoscopic right-eye and left-eye viewing.

The invention has been described with reference to a preferred embodiment. However, it will be appreciated that variations and modifications can be effected by a person of ordinary skill in the art without departing from the scope of the invention. For example, instead of magnetically recording on the filmstrip 24 other known ways of recording such as optically recording can be employed, and instead of the filmstrip various other known image recording mediums such as an electronic medium may be used.

PARTS LIST 10. stereoscopic apparatus
12. camera
14. tripod support
16. single taking lens
18. viewfinder
20. electronic flash unit
22. shutter release button
24. filmstrip
26. transparent magnetic layer
28. cassette
30. magnetic head
32a, 32b. successive film frames
34. magnetic track
36a, 36b. contact-halves
38a, 38b. wire leads
40. shoe
42. support bar
44. bracket
46. positive contact
48. negative contact
50. battery
52. channel
54a, 54b. contact-halves
56a, 56b. contact-halves
58a, 58b. wire leads
60a, 60b. wire leads
62. alignment indicator
64. alignment indicator
66. alignment indicator
68. right controller-encoder
70. left controller-encoder

What is claimed is:

1. A camera comprising means for recording respective image representations of a scene on a recording medium when said camera is at two separated viewpoints with respect to the scene in order to obtain a pair of matched pictures that can be simultaneously viewed to present a stereoscopic image of the scene, is characterized by:

means for recording respective indications on the recording medium, distinguishable from the image representations, that the image representations were recorded with said camera at the two separated viewpoints with respect to the scene, only when said camera is at the two separated viewpoints with respect to the scene.

2. Stereoscopic apparatus comprising a support which has two pre-set locations for locating a camera selectively in two separated viewpoints with respect to a scene in front of the camera to permit the camera to record respective image representations of the scene on a recording medium when the camera is at the two separated viewpoints in order to obtain matched pictures that can be simultaneously viewed to present a stereoscopic image of the scene, is characterized by:

means for enabling recording means in the camera only when the camera is at either one of the two pre-set locations on said support to permit the recording means to record respective indications on the recording medium, distinct from the image representations, that the image representations were recorded with the camera at the two separated viewpoints with respect to the scene.

3. A camera comprising a single taking lens for sequentially exposing respective images of a scene on a pair of substantially adjacent film frames when said camera is in a right picture-taking position and a left picture-taking position in order to obtain a pair of matched pictures that can be simultaneously viewed to present a stereoscopic image of the scene, is characterized by:

means for successively recording respective indications on the adjacent film frames that those film frames were exposed with said camera in the right and left picture-taking positions only when the camera is in the right and left picture-taking positions.

4. Stereoscopic apparatus comprising a camera which has a single taking lens for sequentially exposing respective images of a scene on a pair of substantially adjacent film frames when said camera is in a right picture-taking position and a left picture-taking position in order to obtain a pair of matched pictures that can be simultaneously viewed to present a stereoscopic image of the scene, and a support for said camera which has two pre-set locations for locating the camera selectively in the right and left picture-taking positions, is characterized by:

means for successively recording respective indications on the adjacent film frames that those film frames were exposed with said camera in the right and left picture-taking positions only when the camera is at either one of the two pre-set locations on said support.

5. Stereoscopic apparatus as recited in claim 4, wherein said recording means is to be connected to a battery in order to record the respective indications on the adjacent film frames, and contact means is provided for connecting the battery and said recording means only when said camera is at either one of the two pre-set locations on said support.

6. Stereoscopic apparatus as recited in claim 5, wherein said contact means includes respective fixed electrical contacts on said support at separate locations corresponding to the two pre-set locations on the support and another electrical contact movable with said camera to touch either one of said fixed contacts when the camera is moved to either one of the two pre-set locations.

7. Stereoscopic apparatus comprising a support which has two pre-set locations for locating a camera selectively in a right picture-taking position and a left picture taking position in front of a scene to permit the camera to sequentially expose respective images of the scene on a pair of substantially adjacent film frames when the camera is in either one of the pre-set locations in order to obtain matched pictures that can be simultaneously viewed to present a stereoscopic image of the scene, is characterized by:

means for enabling recording means in the camera only when the camera is at either one of the pre-set locations on said support to permit the recording means to successively record respective indications on the adjacent film frames that those film frames were exposed with the camera in the right and left picture-taking positions.

8. Stereoscopic apparatus as recited in claim 7, wherein said support is adapted to hold a battery and said enabling means includes contact means for connecting the battery and the recording means when the camera is at either one of the two pre-set locations on the support.

9. Stereoscopic apparatus as recited in claim 8, wherein said contact means includes respective electrical contacts on said support at separate locations corresponding to the two pre-set locations on the support.

\* \* \* \* \*